US010637972B2

(12) United States Patent
Yarygin (10) Patent No.: US 10,637,972 B2
(45) Date of Patent: Apr. 28, 2020

(54) SYSTEM FOR DYNAMIC AUDIO VISUAL CAPABILITIES EXCHANGE

(71) Applicant: Silicon Image, Inc., Sunnyvale, CA (US)

(72) Inventor: Sergey Yarygin, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 455 days.

(21) Appl. No.: 14/578,257

(22) Filed: Dec. 19, 2014

(65) Prior Publication Data

US 2015/0326638 A1  Nov. 12, 2015

Related U.S. Application Data

(60) Provisional application No. 61/989,409, filed on May 6, 2014.

(51) Int. Cl.
*H04L 29/06* (2006.01)

(52) U.S. Cl.
CPC ............ *H04L 69/24* (2013.01); *H04L 65/602* (2013.01); *H04L 65/80* (2013.01)

(58) Field of Classification Search
CPC ........ H04L 69/24; H04L 65/602; H04L 65/80
See application file for complete search history.

(56) References Cited

U.S. PATENT DOCUMENTS

| 8,719,373 | B2 * | 5/2014 | Attanasio | .......... H04M 3/42374 |
| | | | | 370/254 |
| 9,338,634 | B2 * | 5/2016 | Gomez Dias | ......... H04W 8/005 |
| 2005/0073608 | A1 * | 4/2005 | Stone | ....................... H04N 7/08 |
| | | | | 348/468 |

(Continued)

FOREIGN PATENT DOCUMENTS

| CN | 101809956 A | 8/2010 |
| CN | 102710739 A | 10/2012 |

OTHER PUBLICATIONS

Roach, A. B. "SIP-Specific Event Notification", RFC 6665, Jul. 2012. <https://tools.ietf.org/html/rfc6665> (Year: 2012).*

(Continued)

*Primary Examiner* — Chris Parry
*Assistant Examiner* — Albert Chiou
(74) *Attorney, Agent, or Firm* — Fenwick & West LLP (57) ABSTRACT

A sink device transmits capabilities information associated with the sink device to the source device. The source device, responsive to receiving the capabilities information of the sink device generates a multimedia stream, and transmits the generated multimedia stream to the sink device to be output to the user. The sink device identifies a portion of the capabilities information that has changed and transmits to the source device a notification notifying the source device that a portion of the capabilities information has changed. The source device transmits a request for the portion of the capabilities information that has changed to the sink device. The sink device responsive to receiving the request transmits the portion of the capabilities information that has changed to the source device. The source device then modifies the multimedia stream output to the sink device based on the portion of the capabilities information that has changed.

22 Claims, 4 Drawing Sheets

(56) References Cited

U.S. PATENT DOCUMENTS

| | | | | |
|---|---|---|---|---|
| 2009/0111467 | A1* | 4/2009 | Chai | H04L 41/00 |
| | | | | 455/435.1 |
| 2009/0233587 | A1* | 9/2009 | Muhonen | H04M 1/72525 |
| | | | | 455/414.1 |
| 2010/0093346 | A1* | 4/2010 | Song | H04L 41/12 |
| | | | | 455/435.1 |
| 2015/0039761 | A1* | 2/2015 | Patil | G06Q 10/10 |
| | | | | 709/225 |

OTHER PUBLICATIONS

"High-Definition Multimedia Interface," Specification Version 1.3a, Hitachi, Ltd. et al., Nov. 10, 2006, 276 pages, [Online] [Retrieved on Apr. 8, 2014] Retrieved from the Internet<URL:http://www.microprocessor.org/HDMISpecification13a.pdf>.

* cited by examiner

SYSTEM FOR DYNAMIC AUDIO VISUAL CAPABILITIES EXCHANGE

CROSS-REFERENCE TO RELATED APPLICATION

This application claims priority from U.S. Provisional Patent Application No. 61/989,409, titled "System for Dynamic Capabilities, Status, and Metadata Exchange" filed on May 6, 2014, the contents of which are incorporated by reference herein in their entirety.

BACKGROUND

1. Field of the Disclosure

This disclosure pertains in general to data communications, and more specifically to the exchange of information associated with the audio visual capabilities and status of a source and a sink device.

2. Description of the Related Art

A sink device using a protocol such as HDMI, MHL, or display port (DP), stores the audio visual capabilities associated with the sink device in a structure called extended display identification data (EDID). On connecting to a source device the sink device transmits the EDID to the source device. The source device may use the audio visual capabilities included in the EDID of the sink device to output a multimedia stream in an audio and video formats supported by the capabilities of the sink device. However, changes to the EDID of the sink device are not typically communicated to the source device in an efficient manner and can also cause interruptions in the multimedia stream.

SUMMARY

Embodiments of the present disclosure are related to communicating audio visual capabilities between a first device, such as a sink device, and a second device, such as a source device. In one embodiment, the first device transmits capabilities information associated with the first device to the second device. The capabilities information includes information identifying the audio visual capabilities of the first device, such as the audio and video formats supported by the first device. The first device, responsive to receiving the capabilities information of the first device generates a multimedia stream based on the capabilities information of the first device, and transmits the generated multimedia stream to the first device.

During operation of the first device, the capabilities information of the first device may change, based on a change in the audio visual capabilities of the first device. The first device identifies the portion of the capabilities information that has changed and transmits to the source device a notification notifying the second device that a portion of the capabilities information of the first device has changed. The notification includes a tag identifying the portion of the capabilities information that has changed. The second device, responsive to receiving the notification from the first device, transmits a request for the portion of the capabilities information that has changed to the first device. The request includes the tag identifying the portion of the capabilities information that has changed. The first device responsive to receiving the request retrieves the portion of the capabilities information that has changed based on the tag and transmits only a subset of the capabilities information that includes the changed portion of the capabilities information of the first device. The second device responsive to receiving the subset of the capabilities information that includes the changed portion of the capabilities information of the first device modifies the multimedia stream being sent from the second device to the first device based on the changed portion of the capabilities information of the first device.

In one embodiment, a first device includes an interface circuit to communicate with a second device that is a source of a multimedia stream for the first device. The first device transmits to the second device capabilities information of the first device. The capabilities information of the first device identifies the audio visual capabilities of the first device. The first device may identify a change in a portion of the capabilities information of the device, and may transmit to the second device only a subset of the capabilities information that includes the changed portion of the capabilities information of the first device.

In one embodiment, a first device includes an interface circuit to communicate with a second device. The first device receives from a second device the capabilities information of the second device. The first device transmits a multimedia stream to the second device based on the capabilities information of the second device. In one example, the first device receives from the second device only a subset of the capabilities information that includes a changed portion of the capabilities information of the second device. The first device modifies the multimedia stream output to the second device based on the changed portion of the capabilities information of the second device. In one embodiment, responsive to determining that the changed portion of the capabilities information of the second device is associated with a visual capability of the second device, the first device modifies the multimedia stream output to the second device by restating the multimedia stream to accommodate the changed portion of the capabilities information of the second device. In another example, responsive to determining that the changed portion of the capabilities information of the second device is not associated with a visual capability of the second device, the first device modifies the multimedia stream output to the second device without restarting the multimedia stream.

BRIEF DESCRIPTION OF THE DRAWINGS

The teachings of the embodiments disclosed herein can be readily understood by considering the following detailed description in conjunction with the accompanying drawings.

Figure (FIG. 1 is a high-level block diagram of a system for data communications, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
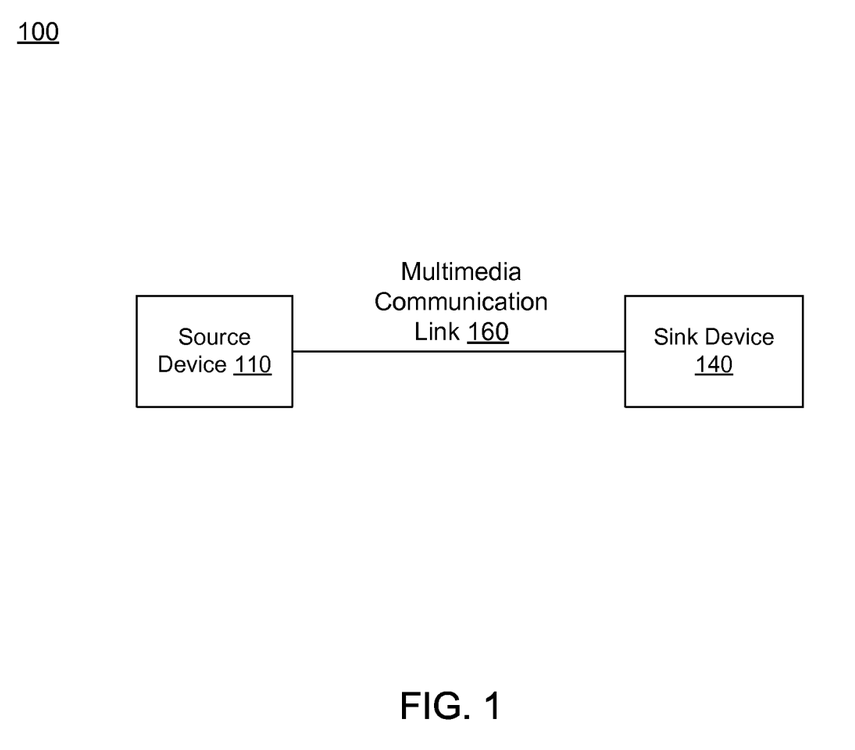

FIG. 1 is a high-level block diagram of a system 100 for data communications, according to one embodiment. The system 100 includes a source device 110 and a sink device 140, communicating with one another through a multimedia communication link 160. In one embodiment, the source device 110 transmits multimedia data streams (e.g., audio/video streams) and control data associated with the multimedia data streams to the sink device 140 through the multimedia communication link 160. The devices in the system 100 together provide audio and visual data to a user of the system 100 in a plurality of forms. In this example, the sink device 140 is a television that receives multimedia streams from the source device 110, to be output to the user.

The devices in the system 100 exchange data using various protocols. In one embodiment, the multimedia communication link 160 represents a Mobile High-Definition Link (MHL) cable. A MHL cable 160 support differential signals transmitted via data lines, which form a single logical communication channel for carrying multimedia data streams. In some embodiments of MHL, there may be more than a single pair of differential data lines. In some versions of MHL, embedded common mode clocks are transmitted through the differential data lines. The MHL cables 160 may further include a control bus (CBUS), power, and ground. The CBUS carries data such as discovery data, or configuration data.

In one embodiment, the multimedia communication link 160 represents a High Definition Multimedia Interface (HDMI) cable. A HDMI cable 160 supports differential signals transmitted via data lines. Each differential pair of lines forms a logical communication channel that carries multimedia data streams. The HDMI cables 160 may further include differential clock lines; Consumer Electronics Control (CEC) control bus; Display Data Channel (DDC) bus; power, ground; hot plug detect; and four shield lines for the differential signals.

Figure 2A:
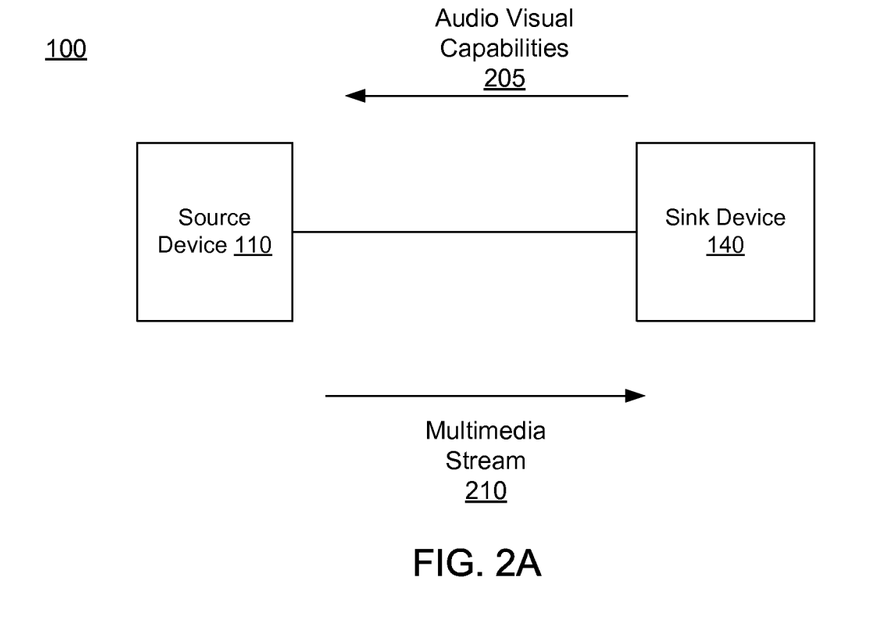
FIG. 2A is an example of a source device transmitting a multimedia stream to a sink device, according to one embodiment.

FIG. 2A is an example of a source device transmitting a multimedia stream to a sink device, according to one embodiment. In one embodiment, the sink device 140, when initially connected to the source device 110 via a multimedia link 160 transmits to the source device 110 audio visual capabilities 205 associated with the sink device 140. The audio visual capabilities 205 provided by the sink device 140 describe the audio visual abilities that are supported by the sink device 140. Examples of audio visual capabilities 205 include information associated with the manufacturer of the sink device 140, the frame rate supported by the sink device 140, the video resolution or display size supported by the sink device 140, pixel mapping data associated with the sink device 140, the number of audio channels supported by the sink device 140, the advanced audio capabilities supported by the sink device 140, the language capabilities supported by the sink device 140, and the control capabilities supported by the sink device 140. In addition to the audio visual capabilities 205 the sink device 140 may also transmit to the source device 110 status information describing the status of the sink device 140. For example, the sink device 140 may also transmit status information to the source device 110 describing whether the sink device 140 is powered on.

Once the source device 110 receives the audio visual capabilities 205 of the sink device 140, the source device 110 may generate or configure a multimedia stream based 210 on the audio visual capabilities 205 of the sink device 140, such that the sink device 140 is capable of outputting the configured multimedia stream 210, such as the audio and video formats of the configured multimedia stream. For example, source device 110 determines from the audio visual capabilities 205 of the sink device 140 that the sink device 140 is capable of outputting video data at frame rate of 30 frames per second. The source device 110 configures the multimedia stream 210 such that the multimedia stream includes video data that may be output at a frame rate of 30 frames per second. The source device 110 then transmits the configured multimedia stream 210 to the sink device 140 to be displayed to the user. In addition to the multimedia stream 210, the source device 110 transmits metadata about the source device 110 or the multimedia stream 210 to the sink device 140.

During operation of the sink device 140 the audio visual capabilities 205 of the sink device 140 may change. In one example, the user may change the audio or video configuration of the sink device 140, such as selecting a different number of audio channels used by the sink device 140 to output audio data or selecting a different resolution at which the sink device 140 outputs video data, thereby changing the audio visual capabilities 205 of the sink device 140 as viewed by the source device 110. In a third example, the user may attach a peripheral device 140 to the sink device 140, such as attaching speakers to a display monitor, thereby changing the audio visual capabilities 205 of the sink device 140 as viewed by the source device 110.

In the event that the audio visual capabilities 205 of the sink device 140 change the sink device 140 may no longer properly output the multimedia stream received from the source device 110 as the multimedia stream received from the source device 110 may not be configured to support the audio visual capabilities represented by the changed audio visual capabilities of the sink device 140. Typically the sink device 140 transmits the entire new audio visual capabilities to the source device 110 when there is a change in the audio visual capabilities. The audio visual capabilities are fairly large and can consume much of the bandwidth of the slow control channel (e.g., CBUS, DDC) that it is transmitted across. The sink device 110 then restarts the multimedia stream such that the restarted multimedia stream may be output by the sink device 140. Restarting the multimedia stream results in an interruption of consumption of the multimedia stream by the user and often negatively affects the user experience.

Various embodiments described herein describe methods and systems by which the sink device 140 communicates only the changed portion of the audio visual capabilities of the sink device 140 to the source device 110, thereby reducing bandwidth usage of the control channel and also allowing the source device 110 to reconfigure or modify the multimedia stream such that the multimedia stream may be properly output by the sink device 140 to the user without restarting the multimedia stream.

Figure 2B:
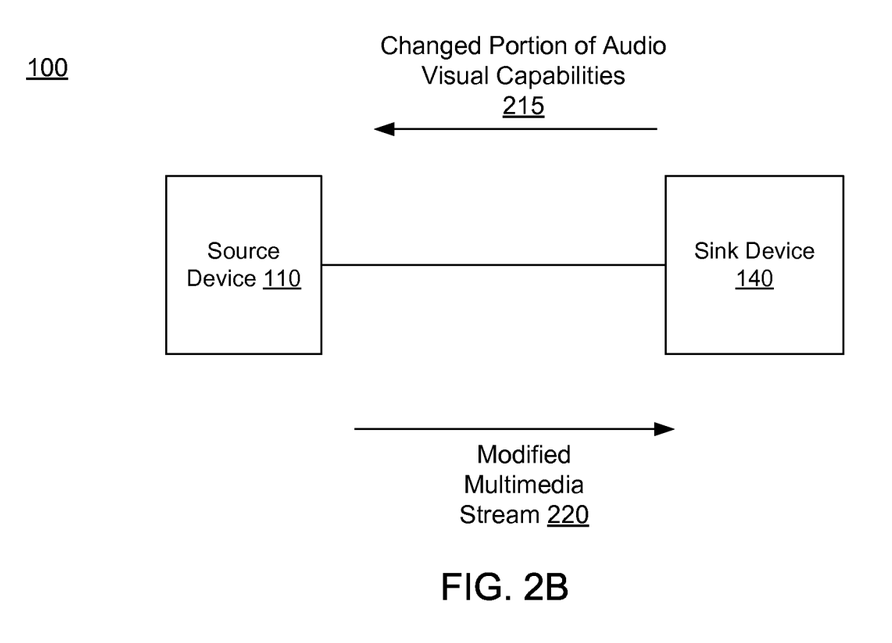
FIG. 2B is an example of the sink device transmitting a changed portion of the audio visual capabilities of the sink device to the source device, according to one embodiment.

FIG. 2B is an example of the sink device transmitting a changed portion of the audio visual capabilities of the sink device to the source device, according to one embodiment. In the example of FIG. 2B the sink device 140 transmits to the source device 110 only a subset of the audio visual capabilities that includes the changed portion of the audio visual capabilities 210 of the sink device 140. As the source device 110 only receives the changed portion of the audio visual capabilities 215, the source device 110 no longer has to parse the entire audio visual capabilities 205 of the sink device 140 to determine the portion of the audio visual capabilities 215 that have changed. This is beneficial as it reduces the latency of the source device 110 in modifying the multimedia stream based on the change in the audio visual capabilities of the sink device 140. The source device 110 modifies the multimedia stream based on the changed portion of the audio visual capabilities and transmits the modified multimedia stream 220 to the sink device 140 for display to the user. Further, the source device 110 may transmit metadata about the modified multimedia stream 210 to the sink device 140.

Figure 3:
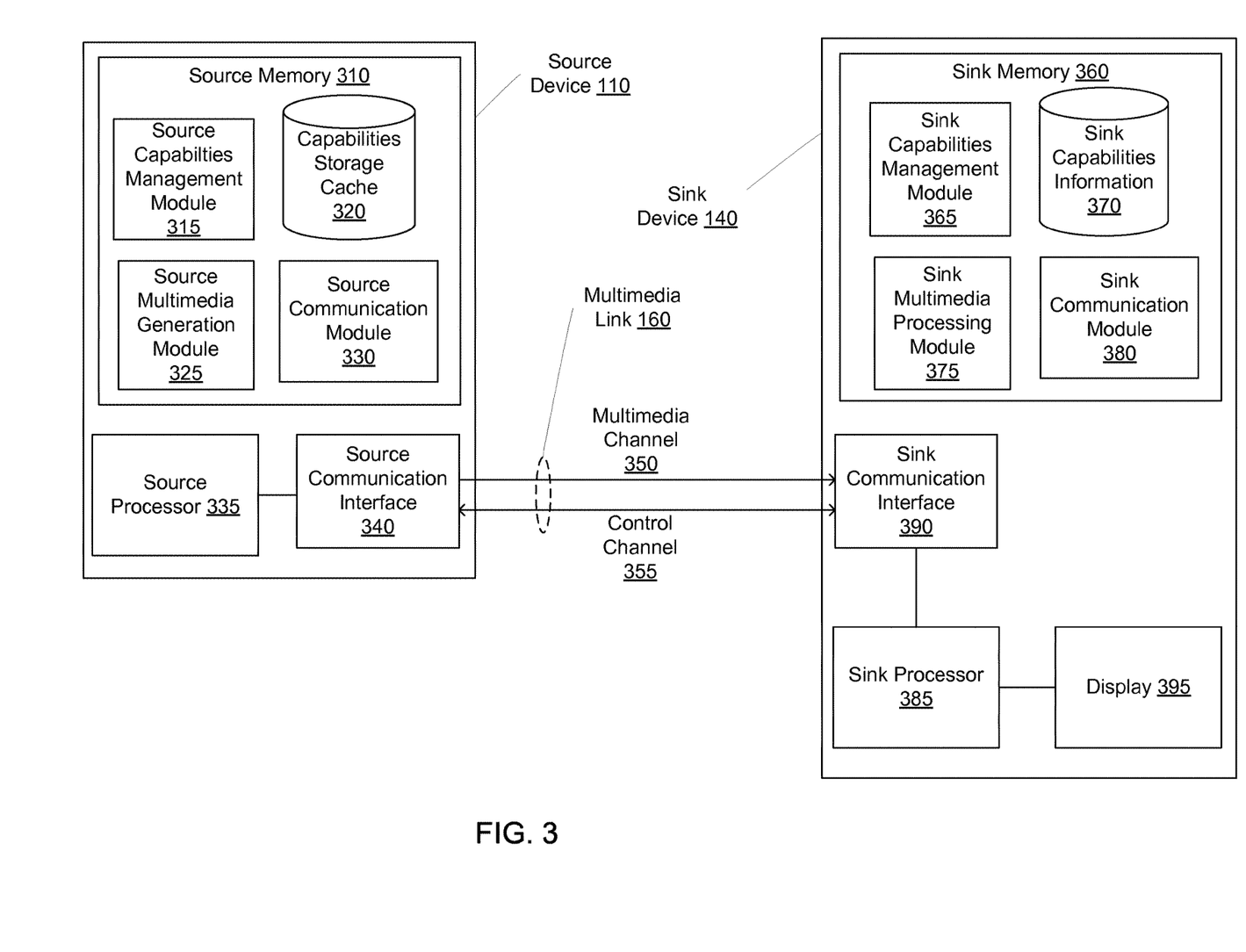
FIG. 3 is a block diagram of the sink device and the source device, according to one embodiment.

FIG. 3 is a block diagram of the sink device and the source device, according to one embodiment. In one embodiment, the source device 110 includes a source processor 335, a source communication interface 340, and a source memory 310. Examples of the source processor 335 include a central processing unit (CPU), one or more application specific integrated circuits (ASICs) or any combination of these. The source processor 335 is configured to communicate with the source memory 310 and the source communication interface 340 via one or more busses.

In one embodiment, the source memory 310 includes a non-transitory machine-readable medium on which is stored modules (e.g., software instructions). The modules are executed by the sink processor 385 to perform the methodologies or functions described herein. The instructions (e.g., software) may also reside, completely or at least partially, within the source processor 335 (e.g., within a processor's cache memory) during execution thereof by the source device 110, the source memory 310 and the source processor 335 cache also constituting non-transitory machine-readable media.

While the source memory 310 is described as a non-transitory machine-readable medium and is shown in an example embodiment to be a single medium, the term "machine-readable medium" should be taken to include a single medium or multiple media (e.g., a centralized or distributed database, or associated caches and servers) able to store instructions (e.g., instructions). The term "machine-readable medium" shall also be taken to include any medium that is capable of storing instructions (e.g., instructions) for execution by the machine and that cause the machine to perform any one or more of the methodologies disclosed herein. The term "machine-readable medium" includes, but not be limited to, data repositories in the form of solid-state memories, optical media, and magnetic media.

The source memory 310 includes a source capabilities management module 315, a source capabilities storage cache 320, a source multimedia generation module 325, and a source communication module 330. The capabilities storage cache 320 stores capabilities information associated with the sink device 140. The capabilities information includes audio visual capabilities describing the audio and video capabilities supported by a device. For example, the capabilities storage cache 320 stores a copy of the sink device's audio visual capabilities 370.

The sink's capabilities information 370 may be stored in a variety of ways in the capabilities storage cache 320. In one example, the capabilities information 370 of the sink device 140 are stored in a single entry of the capabilities storage cache 320. In another example, the capabilities information 370 is partitioned amongst a plurality of entries or records in the capabilities storage cache 320. Each record includes a portion of the capabilities information representing a particular audio visual capability of the sink device 140, as determined from the sink's capabilities information 370. Further, each record may have a different length and size. For example, one record includes information describing the frame rate supported by the sink device 140, while a second record includes the video resolution supported by the sink device 140. Further, each record may also be associated with an identifier such as a tag, thereby allowing the records stored in the capabilities storage cache 320 to be identified and retrieved without determining the contents of the record. Each record may also be associated with a generation identifier identifying the number of times the record has been changed. In some embodiment, the sink device 140 may have a capabilities storage cache similar to that of the source's capabilities storage cache 320, and includes capabilities information associated with the various devices connected to the sink device 140.

The source capabilities management module 315 receives the sink's capabilities information 370, and manages changes to the capabilities storage cache 320. In one example, the capabilities management module 315 receives the capabilities of the sink device 140, and stores the capabilities information 370 in the capabilities storage cache 320. The source capabilities management module 315 may analyze the capabilities information of the sink device 140 to determine the different audio and video capabilities associated with the sink device 140 and may store the different portions of the capabilities information 370 in different records associated with the capabilities information 370 in the capabilities storage cache 320.

In one embodiment, the source capabilities management module 315 manages changes to the capabilities information of the sink device 140. The source capabilities management module 315 may receive an indication from the sink device 140 that the capabilities information of the sink device 140 has changed. Along with the indication the source capabilities management module 315 may also receive a tag identifying a location of the changed portion of the capabilities information 370 from the sink device 140. The source capabilities management module 315 may transmit a request to the sink device 140 requesting the changed portion of the capabilities information 370. On receiving the changed portion of the capabilities information 370 from the sink device 140, the source capabilities management module 315 modifies the records of the capabilities storage cache 320 to include the changed portion of the capabilities information 370. For example, the source capabilities management module 315 identifies, based on the tag associated with the changed portion of the capabilities information 370, the record in a capabilities storage cache 320 associated with the changed portion of the capabilities information 370, and modifies the record to include the changed portion of the capabilities information 370.

The source multimedia generation module 325 generates or configures a multimedia stream to be output to the sink device 140. In one embodiment, the source generation module 325 configures a multimedia stream to be output to the sink device 140 based on the audio visual capabilities of the sink device 140 as determined from the copy of the sink capabilities information 370 stored in the capabilities storage cache 320. For example, the source multimedia generation module 325 retrieves the sink capabilities information 370 from the capabilities storage cache 320, determines the audio visual capabilities of the sink device 140 from the retrieved capabilities information of the sink device 140, and configures the multimedia stream based on the determined audio visual capabilities of the sink device 140.

In one embodiment, the source multimedia generation module 325 modifies the configured multimedia stream or re-configures the multimedia stream output to the sink device 140 on determining that the sink capabilities information 370 has changed. In one example, the source multimedia generation module 325 determines from an indication provided by the source capabilities management module 315 that the sink capabilities information 370 has changed. In addition to determining that the sink's capabilities information 370 has changed, the source multimedia generation module 325 identifies the portion of the sink's capabilities information 370 that has changed and retrieves the changed portion of the sink's capabilities information 370 from the capabilities storage cache 320. In another example, the source multimedia generation module 315 receives the tag associated with the changed portion of the capabilities information of the sink device 140 and retrieves the changed portion of the capabilities information 370 from the source capabilities storage cache 320 based on the tag associated with the changed portion of the capabilities information.

Once the source multimedia generation module 325 identifies and retrieves the changed portion of the capabilities information of the sink device 140, the source multimedia generation module 325 may reconfigure or modify the multimedia stream to output to the sink device 140. For example, the source multimedia generation module 325 determines that the audio capabilities of the sink device 140 have changed, based on the changed portion of the capabilities information of the sink device, and modifies or re-configures the audio portion of the multimedia stream to comply with the audio capabilities supported by the sink device 140 without interrupting the video portion.

In one embodiment, the source multimedia generation module 325 determines from the changed portion of the capabilities information of the sink device 140 whether to restart the multimedia stream output to the sink device 140. For example, on determining that certain video capabilities, such as the resolution of the video data supported by the sink device 140, have changed, the source multimedia generation module 325 restarts the multimedia stream output to the sink device 140 such that the restarted multimedia stream complies with the changed video capabilities supported by the sink device 140.

The source communication module 330 receives communications at the source device 110, and prepares and transmits communications from the source device 110 to the various devices connected to the source device via the source communication interface 340 for example. In one embodiment, the source communication module 330 routes communications received to the respective modules in the source memory 310 assigned to handle the received communications. For example, the source communication module 330 receives a communication from the sink device 140 including the capabilities information of the sink device 140, and forwards the communication to the source capabilities management module 315 to be analyzed. In another embodiment, the source communication module 330 transmits communications received from one or modules to a device connected to the source device 110 via the multimedia link 160. For example, the source communication module 330 transmits a request for the changed portion of the capabilities information of the sink device 140 from the source capabilities management module 315 to the sink device 140. The source communication module 330 may format communications into the various protocols (e.g., MHL or HDMI) that are appropriate for transmitting communications via the multimedia links 160.

The source communication interface 340 includes an interface circuit that that is communicatively coupled to the multimedia link 160. The source communication interface 340 receives communications from the sink device 140 via a multimedia link 160 and transmits multimedia streams and communications to the sink device 140 via the multimedia link 160. The multimedia link may include a multimedia channel 350 for carrying a multimedia stream including audio data and video data, and a control channel 355 for carrying control codes and capabilities information. The source communication interface 340 serializes the data to be communicated (as generated by the source communication module 330), such as the multimedia data or the request for a changed portion of the capabilities information, and transmits differential signals for the data to be communicated across the multimedia link 160 to the sink communication interface 190.

The sink device 140 includes a sink processor 385, a sink communication interface 390, a sink memory 360, and a display 395. Examples of the sink processor 385 include a central processing unit (CPU), a graphics processing unit (GPU), a digital signal processor (DSP), one or more application specific integrated circuits (ASICs), one or more radio-frequency integrated circuits (RFICs), or any combination of these. The sink processor 385 is configured to communicate with the sink memory 360, the sink display 395, and the sink communication interface 340 via one or more busses.

In one embodiment, the sink memory 360 includes a non-transitory machine-readable medium on which is stored modules (e.g. software instructions). The modules are executed by the sink processor 385 to perform the methodologies or functions described herein. The instructions (e.g., software) may also reside, completely or at least partially, within the sink processor 385 (e.g., within a processor's cache memory) during execution thereof by the sink processor 385, the sink memory 360 and the sink processor 385 cache also constituting non-transitory machine-readable media.

In one embodiment, the sink memory 360 includes a sink capabilities management module 365, a sink capabilities information 370, a sink multimedia processing module 375, and a sink communication module 380. The sink capabilities information 370 has several records. Each record includes a portion of the capabilities information 370 representing a particular audio visual capability of the sink device 140. For example, one record includes information describing the frame rate supported by the sink device 140, while a second record includes the video resolution supported by the sink device 140. Further, each record may also be associated with an identifier such as a tag specifying the location of the record within the capabilities information 370. The capabilities information 370 may be hundreds of records long, and the tag thus identifies a specific record (e.g. 1, 2, 3, 4, 5) within the capabilities information 370.

The sink capabilities management module 365 manages changes to the sink capabilities information 370 of the sink device 140 over time. The sink capabilities management module 365 may analyze the audio visual capabilities of the sink device 140 to generate the sink capabilities information 370. For example, the sink capabilities management module 365 identifies the various hardware components included in or connected to the sink device 140, and determines based on the identified hardware components the sink's capabilities information 370. The sink capabilities management module 365 transmits the capabilities information 370 of the sink device 140 to the source device 110.

In one embodiment, the sink capabilities management module 365 manages changes to the sink's capabilities information 370. For example, the sink capabilities management module 365 may determine that an audio visual capability of the sink device 140 has changed, and based on the change and/or type of audio visual capabilities identifies the changed portion of the capabilities information 370. On identifying the changed portion of the sink capabilities information 370, the sink capabilities management module 365 modifies the appropriate record in the sink's capabilities information 370.

Further, the sink capabilities management module 365, on identifying the changed portion of the capabilities information 370, prepares a notification to send to the source device 110 notifying the source device 110 that the capabilities information of the sink device 140 has changed. In one example, the notification includes the tag identifying the location of the changed portion of the sink's capabilities information 370. The sink device 140 may receive from the source device 110 a request for the changed portion of the sink's capabilities information 370. The request may include the tag identifying the location of the changed portion of the sink's capabilities information 370, as provided by the sink device 140 in the notification. Responsive to receiving the request, the sink capabilities management module 365 may retrieve the changed portion of the sink's capabilities information 370 and transmit only the changed portion of the capabilities information 370 to the source device 110. The unchanged portions of the capabilities information 370 are not transmitted to reduce the amount of data that is transmitted to the source device 110 via the control channel 355.

The sink multimedia processing module 375 processes the multimedia stream received from the source device 110, such that the multimedia stream may be output by the sink device 140 to the user, via the display 395 for example. In one embodiment, the sink multimedia processing module 370 decodes the multimedia stream received from the source device 110 to determine the audio visual data included in the multimedia stream. In one embodiment, the multimedia processing module 375 process the received multimedia as outlined by the audio visual capabilities of the sink device 140, and prepares the multimedia stream for output to the user.

The sink communication module 380 manages communication received by and transmitted from the sink device 140. For example, the sink communication module 380 transmits the sink's capabilities information 370 to the source device 110. In one embodiment, the sink communication module 380 routes communications received to the respective modules in the sink memory 360 assigned to handle the received communications. For example, the sink communication module 380 receives a communication from the source device 110 requesting the changed portion of the sink's capabilities information 370, and forwards the communication to the sink capabilities management module 365 to be analyzed. In another embodiment, the sink communication module 380 transmits communications received from one or more modules to a device connected to the sink device 140 via the multimedia link 160. For example, the sink communication module 380 transmits the changed portion of the sink's capabilities information 370 from the sink capabilities management module 380 to the source device 110. The sink communication module 380 may format communications into the various protocols (e.g., MHL or HDMI) that are appropriate for transmitting communications via the multimedia link 160.

The sink communication interface 390 that is communicatively coupled to the multimedia link 160. The sink communication interface 390 includes an interface circuit that receives communications from the source device 110 via the multimedia link 160 and transmits communications to the source device 110 via the multimedia link 160. In one embodiment, the sink communication interface 390 receives a multimedia stream from the source device 110 via the multimedia channel 350 of the multimedia link 160, and transmits the sink's capabilities information 370 and communications associated with the sink's capabilities information 370 via the control channel 355 of the multimedia link 160. The sink communication interface 390 serializes the data to be communicated (as generated by the sink communication module 380), such as the changed portion of the sink's capabilities information 370, and transmits signals for the data to be communicated across the multimedia link 160 to the source communication interface 340.

The display 395 is configured to display the video data included in the multimedia stream to the user. Examples of the display 395 include a plasma display panel (PDP), a liquid crystal display (LCD), a projector, or a cathode ray tube (CRT). In other embodiments the sink device 140 may also include speakers for producing audio from the audio portion of the multimedia stream.

Figure 4:
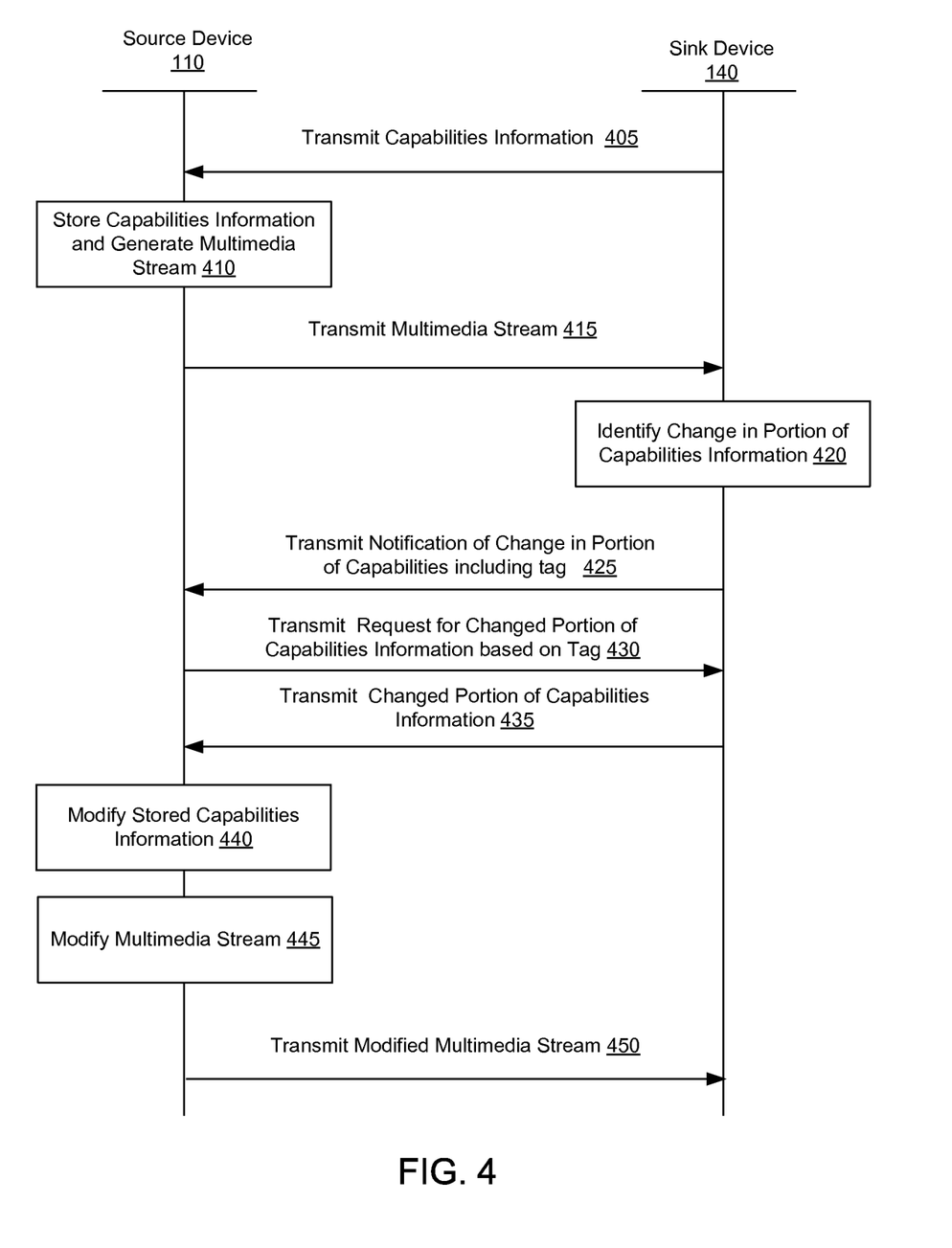
FIG. 4 is an interaction diagram illustrating the communication of capabilities information between a sink device and a source device, according to one embodiment.

FIG. 4 is an interaction diagram illustrating the communication of capabilities information between a sink device and a source device, according to one embodiment. In one embodiment, the sink device 140 on connecting or first establishing a link with the source device 110 transmits 405 capabilities information 405 describing the audio visual capabilities of the sink device 140. The source device 110 stores 410 the received capabilities information and generates 410 a multimedia stream to output to the sink device 140 based on the received capabilities information. As the multimedia stream is generated based on the capabilities information of the sink device 140, the sink device 140 has sufficient audio visual capabilities to support and output the multimedia stream. The source device 110 transmits 415 the multimedia stream to the sink device 140.

In one embodiment, the audio visual capabilities supported by the sink device 140 may change thereby resulting in a change in a portion of the capabilities information of the sink device 140. For example, the user may select different audio visual settings of the sink device 140 than previously selected thereby changing the audio visual capabilities of the sink device 140 and a portion of the capabilities information of the sink device 140. The sink device 140 identifies 420 a change in the portion of the capabilities information 420. For example, if the user selects a different resolution at which the user would like the sink device 140 to output video data of the multimedia stream, the sink device 140 identifies 420 the change in the portion of the capabilities information associated with the resolution of the video data supported by the sink device 140.

The sink device 140 transmits 425 a notification to the source device 110 notifying the source device 110 that a portion of the capabilities information of the sink device 140 has changed. In one example, the notification includes a tag identifying the location of the changed portion of the capabilities information. The source device 110, responsive to receiving the notification, transmits 430 to the sink device 140 a request for the changed portion of the capabilities information. In one example, the request includes the tag identifying the location of the changed portion of the capabilities information.

The sink device 140, responsive to receiving the request for the changed portion of the capabilities information, transmits 435 to the source device 110 a subset of the capabilities information that includes the changed portion of the capabilities information. The source device 110 on receiving the changed portion of the capabilities information modifies 440 the stored capabilities information to include the changed portion of the capabilities information. For example, the source device 110 identifies the portion of the stored capabilities information that has changed based on the tag, and replaces the identified portion of the stored capabilities information with the changed portion of the capabilities information received from the sink device 140. In another example, the source device 110 may identify a record in the capabilities storage cache 320 based on the tag, and replaces the contents of the record with the changed portion of the capabilities information received from the sink device 140.

The source device 110 modifies 445 the multimedia stream output to the sink device 140 based on the changed portion of the capabilities information. In one embodiment, the source device 110 modifies the multimedia stream without restarting the multimedia stream. For example, the source device 110 on identifying that the changed portion of the capabilities information is related to a change in an audio capability of the sink device 140 modifies 445 the multimedia stream without restarting it to accommodate the change in the audio capability of the sink device 140. In another embodiment, the source device 110 modifies 445 the multimedia stream by restarting the multimedia stream. For example, on identifying that the changed portion of the capabilities information is related to a change in a video capability of the sink device 140, such as a change in the frame rate or resolution supported by the sink device 140, restarts the multimedia stream to accommodate the change in the video capability of the sink device 140. The sink device 140 transmits 450 the modified multimedia stream 450 to the sink device 140.

In one embodiment, the sink device 140 on identifying 420 a change in a portion of the capabilities information transmits, along with a notification to the source device 110, the changed portion of the capabilities information. Thus, in this embodiment, apart from notifying the source device 110 that a portion of the capabilities information of the sink device 140 has changed, the sink device 140 also transmits the changed portion of the capabilities information, thereby immediately providing the source device 110 with the changed portion of the capabilities information prior to receiving a request for the changed portion of the capabilities information from the source device 110. In an alternative embodiment, the sink device 140 may transmit the changed portion of the capabilities information without transmitting the notification to the source device 110.

The sink device 140 may determine whether to transmit to the source device 110 the changed portion of the capabilities information along with the notification based on the type or portion of the capabilities information that has changed. For example, on identifying a change to the video capabilities of the sink device 140, the sink device 140 transmits to the source device 110 the changed video capabilities information along with the notification. In a second example, on identifying a change to the language capabilities of the sink device 140, the sink device 140 transmits to the source device 110 a notification notifying the source device 110 of the change in the language capabilities. In the second example, the sink device 140 transmits the change in the language capabilities responsive to receiving a request from the source device 110 for the changed portion in the capabilities information.

Upon reading this disclosure, those of skill in the art will appreciate still additional alternative designs for communication of capabilities information. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A method of communicating audio visual capabilities, the method comprising:

establishing a cable interface connecting a first device corresponding to a sink device and a second device corresponding to a source device for transmitting uncompressed video data;

transmitting, from the first device to the second device via the cable interface, one or more records indicating capabilities information of the first device, the capabilities information of the first device identifying audio visual capabilities of the first device;

storing the received records indicating capabilities information of the first device on the second device;

transmitting, from the second device to the first device via the cable interface, a multimedia stream based on the stored capabilities information of the first device;

identifying, at the first device, a change in a subset of the capabilities information of the first device during transmission of the multimedia stream;

in response to identifying the change in the subset of the capabilities information of the first device, transmitting, via the cable interface, a first communication from the first device to the second device notifying the second device of the change in the subset of the capabilities information of the first device, the first communication including a tag identifying a location of records within the capabilities information from which the changed subset of capabilities information can be retrieved from the first device, but not including the changed subset of capabilities information of the first device;

in response to receiving the tag at the second device, transmitting, via the cable interface, a second communication from the second device to the first device corresponding to a request for the subset of the capabilities information that has changed, the request comprising the tag received from the first device as part of the first communication;

transmitting, via the cable interface, a third communication from the first device to the second device in response to the second communication, the third communication comprising records corresponding to the changed subset of capabilities information of the first device identified using the tag, and not including records of the capabilities information not part of the changed subset identified using the tag;

using the tag, identifying, at the second device, records corresponding to a subset of the capabilities information of the first device stored on the second device;

updating the capabilities information of the first device stored on the second device by replacing the identified records corresponding to the subset of capabilities information with the changed subset of capabilities information received from the first device via the third communication; and modifying, at the second device, the multimedia stream being sent from the second device to the first device based on the subset of the capabilities information of the first device.

2. The method of claim 1, further comprising:

retrieving, at the first device, responsive to the request, the changed subset of capabilities information of the first device based on the received identification of the location.

3. The method of claim 1, wherein modifying, at the second device, the multimedia stream being sent from the second device to the first device based on the changed subset of the capabilities information of the first device comprises:

determining, by the second device, that the changed subset of the capabilities information of the first device is associated with a changed visual capability of the first device; and in response to the determination that the subset of the capabilities information of the first device is associated with the changed visual capability of the first device, restarting the multimedia stream being sent from the second device to the first device, the restarted multimedia stream accommodating the changed visual capability of the first device.

4. The method of claim 1, wherein modifying, at the second device, the multimedia stream being sent from the second device to the first device based on the changed subset of the capabilities information of the first device comprises:

determining, by the second device that the changed subset of the capabilities information of the first device is not associated with a visual capability of the first device; and modifying the multimedia stream being sent from the second device to the first device without restarting the multimedia stream, the modified multimedia stream accommodating the subset of the capabilities information of the first device not associated with the visual capability of the first device.

5. The method of claim 1, wherein the cable interface connecting the first and second devices corresponds to a multimedia link, wherein the capabilities information is transmitted via a control channel of the multimedia link and the multimedia stream is transmitted via a multimedia channel of the multimedia link.

6. The method of claim 1, further comprising:

transmitting, from the first device to the second device, status information of the first device, the status information of the first device identifying the status of the first device.

7. The method of claim 1, further comprising:

transmitting, from the second device to the first device, metadata information associated with the multimedia stream.

8. The method of claim 1, further comprising:

determining, by the second device, that the subset of the capabilities information of the first device is associated with a changed visual capability of the first device;

in response to the determination that the subset of the capabilities information of the first device is associated with the changed visual capability of the first device, modifying the multimedia stream by restarting the multimedia stream being sent from the second device to the first device, the restarted multimedia stream accommodating the changed visual capability of the first device;

identifying, at the first device, a second change in a second subset of the capabilities information of the first device;

determining, by the second device, that the changed second subset of the capabilities information of the first device is not associated with a visual capability of the first device; and in response to the determination that the changed second subset of the capabilities information of the first device is not associated with a visual capability of the first device, modifying the multimedia stream being sent from the second device to the first device without restarting the multimedia stream, the modified multimedia stream accommodating the changed second subset of the capabilities information of the first device not associated with the visual capability of the first device.

9. The method of claim 1, wherein the tag identifies a specific record, from a plurality of records, that includes the changed subset of capabilities information.

10. The method of claim 1, where the cable interface uses an HDMI or an MHL protocol.

11. A first device corresponding to a sink device, comprising:

an interface circuit to communicate with a second device that is a source of a multimedia stream for the first device via a cable interface connecting the first device to the second device; and a memory storing instructions, the instructions when executed by a processor cause the processor to:

transmit, to the second device via the cable interface, records indicating capabilities information of the first device, the capabilities information of the first device identifying audio visual capabilities of the first device, wherein the second device is configured to store the transmitted capabilities information;

identify a change in a subset of the capabilities information of the first device during transmission of the multimedia stream;

in response to identifying the change in subset of the capabilities information of the first device, transmit, via the cable interface, a first communication to the second device notifying the second device of the change in the subset of the capabilities information of the first device, the first communication including a tag identifying a location of records within the capabilities information from which the changed subset of capabilities information can be retrieved from the first device and records of capabilities information stored by the second device to be replaced with the changed subset of capabilities information, but not including the changed subset of capabilities information of the first device;

receive, from the second device via the cable interface, a second communication corresponding a request for the subset of the capabilities information, the second communication including the tag received from the first device as part of the first communication;

responsive to receiving the second communication, transmit a third communication to the second device via the cable interface, comprising records corresponding to the changed subset of the capabilities information of the first device identified using the tag, and not including records of the capabilities information not part of the changed subset identified using the tag, wherein the second device uses the tag to identify records corresponding to a subset of the capabilities information of the first device stored on the second device and to update the capabilities information of the first device stored by the second device by replacing the identified records corresponding to the subset of capabilities information with the changed subset of capabilities information received from the first device via the third communication; and cause the multimedia stream to be displayed to a user of the first device.

12. The first device of claim 11, the instructions further comprising instructions to:

receive, responsive to transmitting only the subset of the capabilities information that includes the changed subset of the capabilities information from the first device to the second device, a modified multimedia stream from the second device.

13. The first device of claim 11, the instructions further comprising instructions to:

transmit, to the second device, status information of the first device, the status information of the first device identifying the status of the first device.

14. The first device of claim 11, the instructions further comprising instructions to:

receive, from the second device, metadata information associated with a multimedia stream.

15. The first device of claim 11, wherein the cable interface connecting the first and second devices corresponds to a multimedia link, wherein the capabilities information is transmitted via a control channel of the multimedia link and the multimedia stream is received by the first device via a multimedia channel of the multimedia link.

16. A first device corresponding to a source device, comprising:

an interface circuit to communicate with a second device corresponding to a sink device via a cable interface connecting the first device to the second device;

a memory storing instructions, the instructions when executed by a processor cause the processor to:

receive, from the second device via the cable interface, one or more records indicating capabilities information of the second device, the capabilities information of the second device identifying audio visual capabilities of the second device;

store the received records indicating capabilities information of the second device;

transmit a multimedia stream to the second device based on the capabilities information of the second device;

receive, from the second device via the cable interface, a first communication indicating a change in a subset of the capabilities information of the second device, the first communication including a tag identifying a location of records within the capabilities information from which the changed subset of capabilities information of the second device can be retrieved from the second device, but not including the changed subset of capabilities information of the second device;

in response to receiving the identification of the location from the second device, transmit a second communication to the second device via the cable interface, the second communication corresponding to a request for the subset of the capabilities information of the second device and comprising the tag received from the second device as part of the first communication, responsive to transmitting the second communication to the second device, receive, from the second device via the cable interface, a third communication comprising records corresponding to the changed subset of capabilities information of the second device corresponding to the tag, and not including records of the capabilities information not part of the changed subset corresponding to the tag;

use the tag to identify records corresponding to a subset of the capabilities information of the second device stored on the first device;

update the stored capabilities information of the second by replacing the identified records corresponding to the capabilities information with the changed subset of capabilities information received from the second device via the third communication; and modify, based on the changed subset of the capabilities information of the second device, the multimedia stream transmitted to the second device.

17. The first device of claim 16, wherein the instructions when executed by the processor cause the processor to modify, based on the changed subset of the capabilities information of the second device, the multimedia stream output to the second device by:

determining that the changed subset of the capabilities information of the second device is associated with a changed visual capability of the second device; and in response to the determination that the subset of the capabilities information of the first device is associated with the changed visual capability of the first device, restarting the multimedia stream output to the second device, the restarted multimedia stream accommodating the changed visual capability of the second device.

18. The first device of claim 16, wherein the instructions when executed by the processor cause the processor to modify, based on the changed subset of the capabilities information of the second device, the multimedia stream output to the second device by:

determining that the changed subset of the capabilities information of the second device is not associated with a visual capability of the second device; and modifying the multimedia stream output to the second device without restarting the multimedia stream, the modified multimedia stream accommodating the subset of the capabilities information of the second device not associated with the visual capability of the second device.

19. The first device of claim 16, wherein the instructions further cause the processor to:

receive, from the second device, status information of the second device, the status information of the second device identifying the status of the second device.

20. The first device of claim 16, wherein the instructions further cause the processor to:

transmit metadata information associated with a multimedia stream to the second device.

21. The first device of claim 16, wherein the first and second devices communicate through a multimedia link, the capabilities information is received via a control channel of the multimedia link and the multimedia stream is transmitted via a multimedia channel of the multimedia link.

22. The first device of claim 16, wherein the instructions further cause the processor to:

determine that the subset of the capabilities information of the second device is associated with a changed visual capability of the second device;

in response to the determination that the subset of the capabilities information of the second device is associated with the changed visual capability of the second device, modify the multimedia stream by restarting the multimedia stream output to the second device, the restarted multimedia stream accommodating the changed visual capability of the second device;

receive, from the second device, information indicating a second change in a second subset of the capabilities information of the first device;

determine that the changed second subset of the capabilities information of the second device is not associated with a visual capability of the second device; and in response to the determination that the changed second subset of the capabilities information of the second device is not associated with a visual capability of the second device, modify the multimedia stream output to the second device without restarting the multimedia stream, the modified multimedia stream accommodating the changed second subset of the capabilities information of the second device not associated with the visual capability of the second device.

* * * * *